United States Patent [19]

Alderman et al.

[11] Patent Number: 5,246,514
[45] Date of Patent: Sep. 21, 1993

[54] FIBERGLASS BLANKET AND BACKING SHEET LAMINATOR SYSTEM WITH SONIC VIBRATION AND VACUUM REMOVAL OF BROKEN FIBERGLASS PARTICLES

[75] Inventors: Robert J. Alderman, Marathon, Fla.; James E. Taylor, Seguin, Tex.

[73] Assignee: Energy Blanket of Texas, Inc., Seguin, Tex.

[21] Appl. No.: 706,013

[22] Filed: May 28, 1991

Related U.S. Application Data

[63] Continuation-in-part of Ser. No. 516,990, Apr. 30, 1990, abandoned.

[51] Int. Cl.5 .................. B08B 5/04; B32B 31/16
[52] U.S. Cl. ..................... 156/73.1; 15/308; 15/309.1; 134/21; 156/285; 156/324
[58] Field of Search ............ 156/324, 285, 62.2, 156/731, 736, 281; 15/309.1, 308, 306.10, 300.1, 367, 393, 394; 134/21; 210/785

[56] References Cited

U.S. PATENT DOCUMENTS

| 2,211,838 | 8/1940 | Riggs | 134/21 |
| 2,730,113 | 1/1956 | Hadley | 15/309 |
| 4,042,509 | 8/1977 | Bowen | 210/785 |
| 4,333,369 | 6/1982 | McCort | 15/309.1 |
| 4,715,078 | 12/1987 | Howard | 134/21 |
| 4,932,426 | 6/1990 | Wolff | 134/21 |
| 4,944,809 | 7/1990 | Ohberg | 15/302 |

FOREIGN PATENT DOCUMENTS

| 2929141 | 2/1981 | Fed. Rep. of Germany | 134/21 |
| 0043262 | 4/1979 | Japan | 156/324 |
| 0443587 | 3/1968 | Switzerland | 15/308 |
| 2017578 | 10/1979 | United Kingdom | 156/324 |

Primary Examiner—Michael W. Ball
Assistant Examiner—Daniel J. Stemmer
Attorney, Agent, or Firm—Hopkins & Thomas

[57] ABSTRACT

The fiberglass blanket (11) is fed into contact with the adhesively coated surface (18) of the backing sheet (12) and the two layers are adhesively bonded together. Sound emitters (68, 71) vibrate the fiberglass, causing separation of the loose glass from the blanket. A vacuum system (51) draws off and collects the loose fiberglass particles (66), to clean the blanket of loose particles of fiberglass.

14 Claims, 5 Drawing Sheets

FIBERGLASS BLANKET AND BACKING SHEET LAMINATOR SYSTEM WITH SONIC VIBRATION AND VACUUM REMOVAL OF BROKEN FIBERGLASS PARTICLES

CROSS REFERENCE TO RELATED APPLICATION

This application is a continuation-in-Part of U.S. patent application Ser. No. 516,990 filed Apr. 30, 1990, now abandoned.

FIELD OF THE INVENTION

The present invention relates in general to a method and apparatus for forming a laminated fiberglass heat insulation blanket and a backing sheet with the exposed surfaces of the blanket being relatively free of loose fiberglass. More particularly, the present invention relates to a method and apparatus for applying the backing sheet to the blanket and removing the loose fiberglass from the exposed surfaces of the blanket.

BACKGROUND OF THE INVENTION

Fiberglass is extensively used as heat insulation for the roof and wall structures of residential and industrial buildings as well as other structures and objects. Fiberglass blankets usually are easy to install and provide an economical and effective insulating barrier to retard the transfer of heat through the roof and wall structures of buildings and through the walls of conduits and other structures used to contain hot or cold materials. Some of the conventional fiberglass heat insulating materials are elongated blankets of uniform width and thickness, with a sheet of vapor impervious material adhesively secured to one side surface of the blanket. The laminated blankets are formed in a continuous process by the compression together of the fiberglass blanket and an adhesively coated surface of the sheet of backing material. Such a method is an economical and an efficient means of forming conventional fiberglass insulating materials.

However, the handling of the fiberglass blanket in this production process causes several problems. Perhaps the most annoying problem is associated with the compressing and bending of the fiberglass blanket which creates small broken fiberglass particles. As the fiberglass blanket is handled, these fiberglass particles are dislocated into the air of the work environment, creating a serious health hazard to workers. Once in the air, the fiberglass particles can be inhaled, possibly damaging the lungs of the workers. Particles of a size within a range of three to ten microns can become lodged in the workers lungs and bronchial tubes, causing damages to the cell structure of the lungs and leading to respiratory ailments. Additionally, when the glass fibers come into contact with the eyes and skin of the workers, they tend to cause blurred vision and small cuts and abrasions that can cause extreme irritation and discomfort.

A second problem caused by the compression and bending of a fiberglass blanket when applying the vapor barrier material to the blanket is a loss of heat insulation capabilities of the fiberglass blanket. When the fiberglass blanket is compressed it is reduced in size, and the volume of the air spaces previously formed within the blanket, which trap dead air and enable the insulation material to retard the transfer of heat, are also reduced in size. As a result of the reduction in size of the air pockets, the heat insulation properties of the fiberglass blanket are reduced.

Accordingly, it can be seen that it would be desirable to provide an efficient and inexpensive method and apparatus for forming a laminated fiberglass heat insulating blanket with a vapor barrier backing sheet, which substantially reduces the presence of loose, broken particles of fiberglass in the insulating material, and minimizes the loss of heat insulating capabilities due to the mechanical compression of the fiberglass blanket of the insulating material.

SUMMARY OF THE INVENTION

Briefly described, the present invention comprises an improved method and apparatus for forming a laminated fiberglass heat insulation blanket with a vapor barrier backing sheet. In a preferred form of the invention, a sheet of backing material is advanced along its length from a supply along a processing path. The backing material passes over an adhesive applicator that engages a surface of the backing sheet and applies a substantially uniform coating of an adhesive material to a surface of the backing sheet. The backing sheet is advanced around a pair of guide rollers which reorient the backing sheet such that the adhesively coated surface of the backing sheet faces upwardly.

In the meantime a fiberglass blanket is advanced along its length from another supply onto the adhesively coated surface of the backing sheet so that the backing sheet and blanket become adhesively attached. A high frequency sound emitter is positioned adjacent the fiberglass blanket, adjacent the point at which the fiberglass blanket is applied to the backing sheet. The high frequency sound emitter functions as a vibrator by emitting sound waves within a range of frequencies sufficient to vibrate and disintegrate particles of fiberglass within a selected range of lengths contained within the fiberglass blanket. The high frequency sound emitter disintegrates loose fiberglass particles of a predetermined size (i.e., 3-10 microns) that can pose a serious health hazard to workers handling the insulation material by becoming lodged in their lungs and causing respiratory problems.

A vacuum system also positioned adjacent the path of the fiberglass blanket induces a flow of air at the surface of the fiberglass blanket. This air flow draws off particles of fiberglass broken from the blanket due to the vibration of the blanket as well as the bending and other handling of the fiberglass blanket as it moves through the process. The air flow also tends to gently pull the backing sheet toward contact with the fiberglass blanket and accelerate the drying of the adhesive to bond the fiberglass blanket to the backing sheet and to remove the odor of the adhesive from the vicinity of the process. Additionally, the air flow tends to cause compressed portions of the fiberglass blanket to decompress and therefore restore the heat insulation properties of the insulation material which had been diminished by compression of the fiberglass blanket.

A low frequency sound emitter is positioned adjacent the vacuum system and emits sound waves at relatively low frequencies. The frequencies of these sound waves are within a range of frequencies that cause the fiberglass dust and the loose particles of fiberglass, which have not been disintegrated by the high frequency sound emitter and which can irritate the skin and eyes of workers handling the insulation material contained within the fiberglass blanket, to vibrate. This vibration causes the dust and loose particles within the fiberglass blanket to migrate through the fiberglass blanket to the upper surface of the fiberglass blanket for removal by the vacuum system. Thus, this sound-induced lower frequency vibration enhances the ability of the vacuum system to remove the dust and remaining loose fiberglass particles contained within the fiberglass blanket. This ensures a more complete removal of the loose fiberglass particles that can irritate the eyes and skin of workers handling the insulation material.

Thus, it is an object of this invention to provide an improved method and apparatus for forming a laminated fiberglass heat insulation blanket with a backing sheet applied to one side thereof.

Another object of this invention is to provide an improved method and apparatus for forming a laminated fiberglass heat insulation blanket with substantially all the loose particles of fiberglass removed from the blanket of fiberglass.

Another object of the invention is to provide a method and apparatus for forming a laminated blanket of fiberglass insulation and a backing sheet which reduces the amount of loose particles of fiberglass and dust in the work environment about the apparatus, and which reduces the risk of exposure of workers to health hazards caused by contact with such particles.

Another object of this invention is to provide an improved method and apparatus for forming a laminated fiberglass heat insulation blanket and backing sheet wherein an air flow is introduced along the path of the blanket, tending to cause the decompression of the fiberglass blanket layer of the insulation material, thus improving the heat insulation properties of the insulation material.

Another object of the invention is to provide an improved fiberglass blanket with a minimum of loose particles of fiberglass contained therein, and to provide an improved process for making the blanket.

Other objects, features and advantages of this invention will be understood by reading the following specification when taken in conjunction with the accompanying drawings.

DESCRIPTION OF THE PREFERRED EMBODIMENTS

Figure 1:
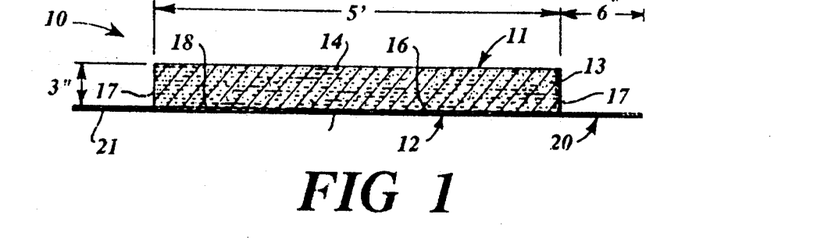
FIG. 1 is an end cross-sectional view of an example of the laminate fiberglass heat insulation material illustrating the different layers of the insulation material.

Referring now in greater detail to the drawings in which like numerals indicate like parts throughout the several views, FIG. 1 illustrates in cross-section a sheet of fiberglass heat insulation material 10 formed by the lamination of a fiberglass blanket 11 to a backing sheet 12. The fiberglass blanket 11 is of a conventional fiberglass insulation material formed from glass fibers spun into a composite material 13. The end cross-section of the fiberglass blanket 11 has a rectangular shape with an upper surface 14, a lower surface 16 and opposed parallel side surfaces 17. The fiberglass blanket 11 can be of almost any width so as to be compatible with the structure to which it is applied, and its thickness usually will be between 3 to 6 inches.

The backing sheet 12 preferably is a sheet of a vinyl or polyethylene vapor impervious material which is relatively flexible but still has some degree of inherent stiffness so as to provide the fiberglass blanket 11 with stability. The backing sheet 12 has an adhesively coated surface 18, a back surface 19 and opposed parallel side edges 21. The back surface 19 of the backing sheet 12 can be covered with a sheet of facing material if desired, such as a heavy gauge paper.

The backing sheet 12 has a width dependent on the width of the fiberglass blanket 11 such that the side edges 21 of the backing sheet 12 extend outwardly past the side surfaces 17 of the fiberglass blanket 11, extending beyond each side surface 17 of the fiberglass blanket 11 usually by approximately 3 to 8 inches to form protruding strips 20 of backing material on both sides of blanket 11.

The resultant fiberglass heat insulation material 11, illustrated in FIG. 1, can be installed in the roof and wall structures of various types of buildings to provide an insulation barrier for such structures. The protruding strips 20 of the backing sheet can be used for attachment to studs, purlins or other parts of the building structure. The blanket and backing sheet are formed of indeterminate length and typically are supplied in reel packages.

Figure 2:
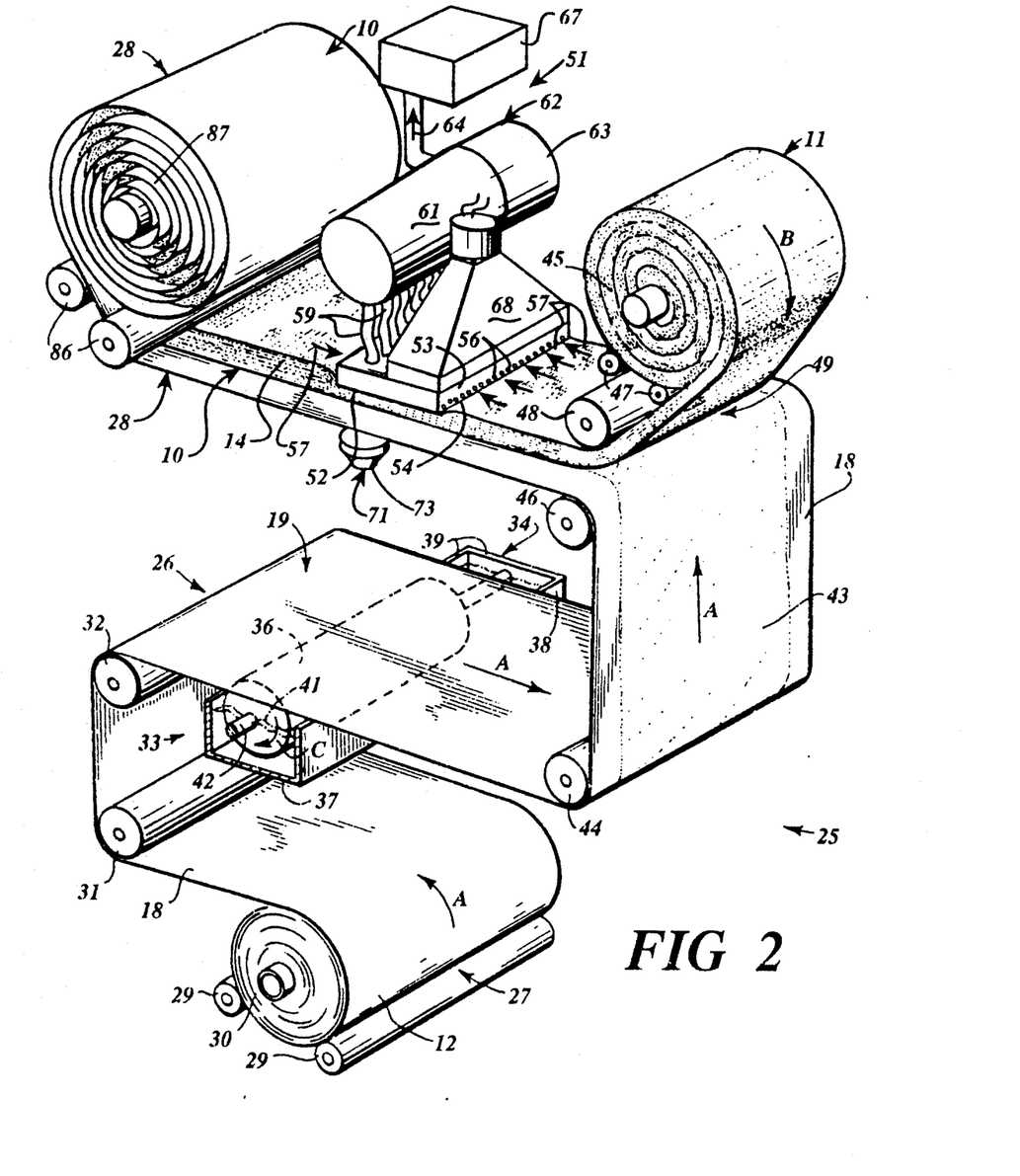
FIG. 2 is a schematic illustration in perspective of the apparatus and process for forming the laminated fiberglass heat insulation material, with the support structure of the apparatus eliminated for clarity.

FIG. 2 schematically illustrates the laminating apparatus 25 and method by which the fiberglass heat insulation material 10 previously described is formed. It will be noted that much of the support structure of the laminating apparatus 25 is omitted for clarity. The laminating apparatus 25 defines converging processing paths, illustrated by arrows A and B, having an input end 27 for the backing sheet 12, and a discharge end 28 for the completed insulation material 10. The backing sheet 12 is laminated to the fiberglass blanket 11 as they move through the processing paths A and B.

Backing sheet feed rollers 29 are positioned at the input end 27 of the processing path 26 for supporting a supply reel 30 of backing material 12. The reel 30 of backing sheet material 12 rests on the rollers 29 and the backing sheet is paid out from the reel in a substantially continuous sheet and advances along its length through the processing path. A pair of guide rollers 31 and 32 are positioned adjacent the backing sheet feed roller 29, one above the other, and guide the backing sheet 12 into engagement with an adhesive applicator 33.

The adhesive applicator 33 is arranged downstream from guide rollers 31 and 32, positioned beneath a downwardly facing surface 18 (FIG. 2) of the backing sheet 12. The adhesive applicator 33 (FIG. 3) includes an adhesive containment vessel 34 and an adhesive roller 36 mounted partially within the adhesive containment vessel 34. The adhesive containment vessel 34 is an open top rectangular trough having a base 37 and four side walls 38 which extend upwardly away from the base 37 terminating at their upper edges 39. A liquid adhesive material 41 is maintained within the adhesive containment vessel 34 and is preferably a water based glue such as BANDMASTER adhesive produced by the National Starch and Chemical Corporation of Bridgewater, N.J. An axle 42 is pivotably attached to two supports (not shown) and supports the adhesive roller 36 within the adhesive containment vessel 34.

Figure 3:
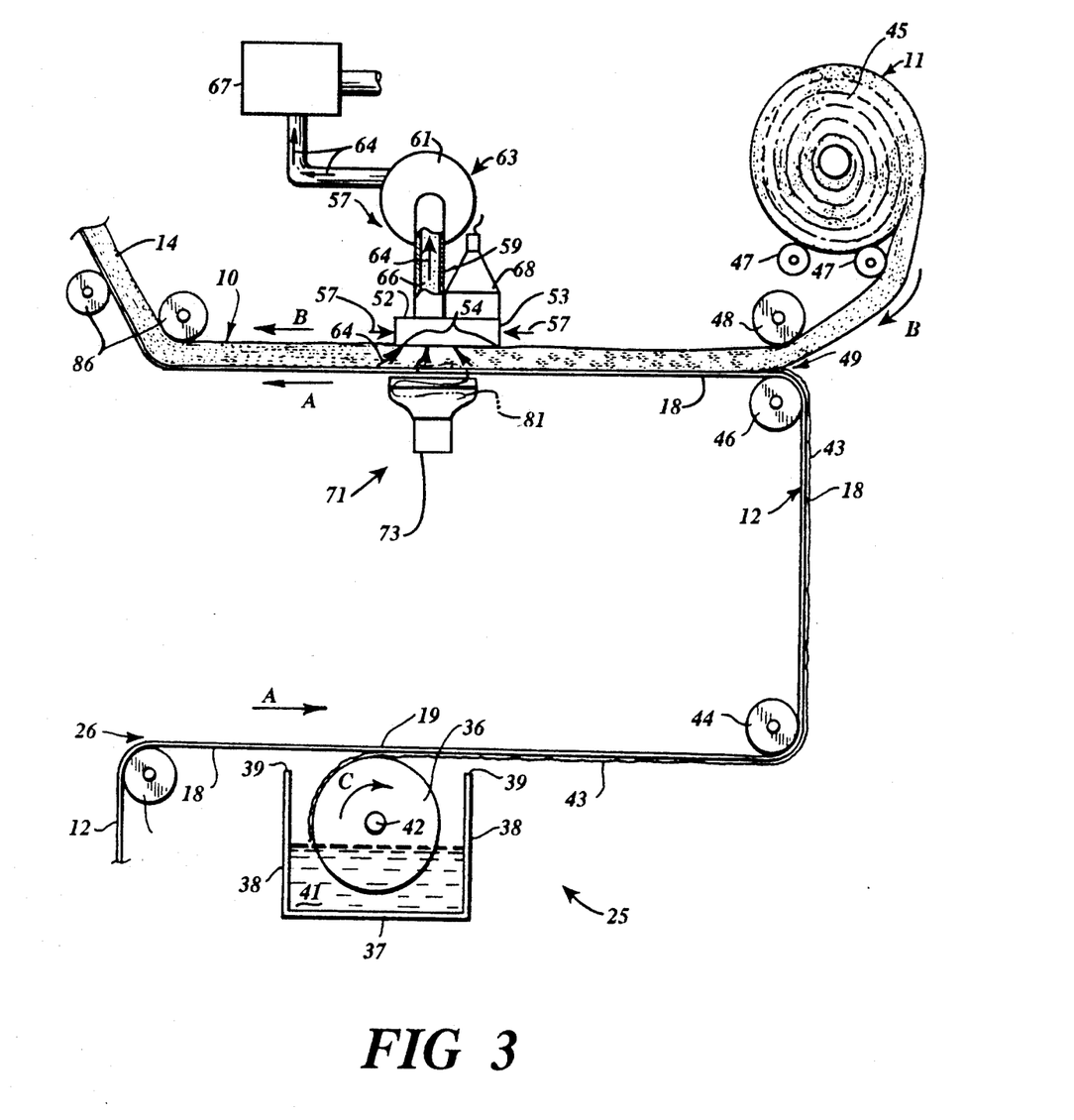
FIG. 3 is a schematic side illustration of the apparatus of FIG. 2.

The surface of adhesive roller 36 is rotated continuously into and out of the adhesive material in the direction of arrow C as the backing sheet 12 passes over it to continuously coat the side surface 18 of the backing sheet with adhesive material 39.

As FIG. 2 illustrates, a second pair of guide rollers 44 and 46 are in contact with the dry surface 19 of the backing sheet 12. The backing sheet 12 is passed around the guide roller 44, moves upwardly and then over the upper guide roller 46 to reorient the backing sheet 12 so the adhesively coated surface 18 of the backing sheet 12 is facing upwardly.

As shown in FIGS. 2 and 3, a supply reel 45 of the blanket material 11 rests on feed roll as 47, and the blanket material 11 pays out from the supply reel 45 and advances along its length through processing path B to feed a substantially continuous fiberglass blanket material 11 into contact with the adhesively coated surface 18 of the backing sheet 12. A blanket guide roller 48, about which the fiberglass blanket 11 passes, is positioned parallel to upper guide roller 46, between upper guide roller 46 and the fiberglass blanket feed rollers 47. The blanket guide roller 48 guides the fiberglass blanket 11 into contact with the adhesively coated side surface 18 of the backing sheet 12 as indicated at 49.

Figure 4:
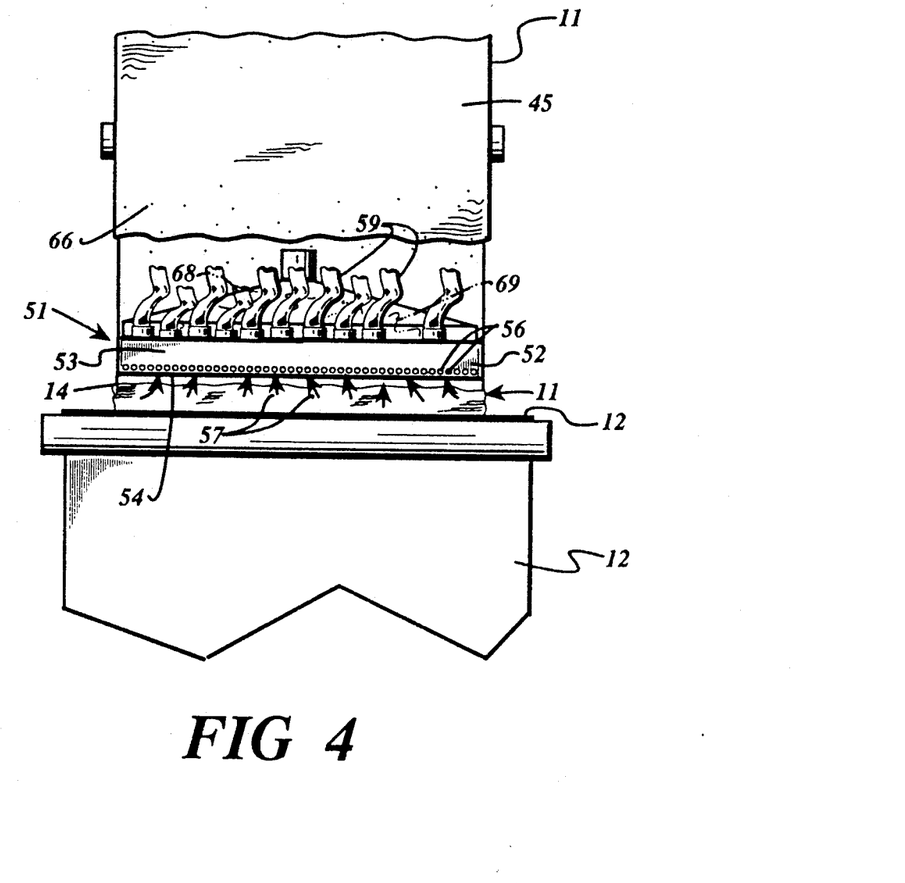
FIG. 4 is an end view of the fiberglass blanket and backing sheet passing beneath the high frequency sound emitter and the nozzle of the vacuum system.
Figure 5:
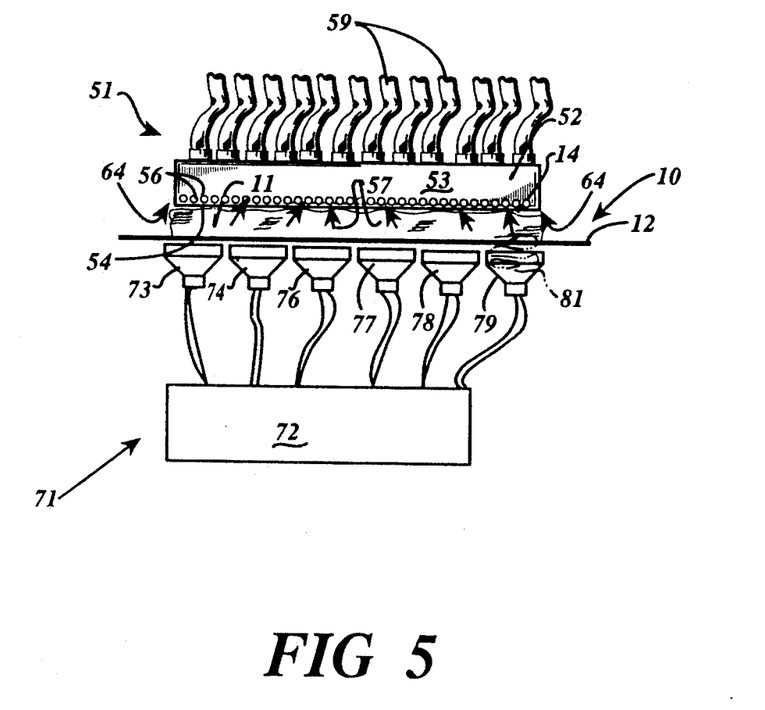
FIG. 5 is an end view of the vacuum system and low frequency sound emitter.

A vacuum system 51 is positioned above the upper surface 14 of the fiberglass blanket 11 downstream from the point 49 at which the fiberglass blanket 11 is applied to the backing sheet 12. The vacuum system 51 includes an elongated rectangularly shaped suction head or nozzle 52 positioned above and in contact with the upper surface 14 of the fiberglass blanket 11 and extending across the width of the fiberglass blanket. As shown in FIGS. 2, 4 and 5, the nozzle 52 is of a width approximately equal to the width of the fiberglass blanket 11, which is typically about six feet across. If the width of the fiberglass blanket is somewhat less than six feet (i.e., three to five feet), the portion of the nozzle that is not covered by the fiberglass blanket can be sealed off to maintain the suction of the vacuum system.

The nozzle 52 is typically formed from sheet metal or other suitable material, and includes four side surfaces 53. The side surfaces 53 of the nozzle 52 each have a lower edge 54 that is in contact with the upper surface 14 of the blanket material such that the upper surface of the blanket material is lightly scraped or scuffed as it passes beneath the nozzle 52 of the vacuum system 51.

A series of air holes 56 are formed along the lower edges 54 of the side surfaces 53 of the nozzle 52, adjacent the upper surface 14 of the blanket material 11. The air holes 56 are approximately ¼ inch in diameter and are spaced apart at intervals of approximately 1 inch. The air holes 56 function to draw an air flow, indicated by arrows 57, across the upper surface 14 of the fiberglass blanket material 11 and into the nozzle through the air holes.

As illustrated in FIGS. 2 and 3, a series of flexible vacuum hoses 59 are connected at one end to the nozzle 52 and extend away from the nozzle 52. It should be noted while only a few hoses 59 have been shown for the sake of clarity, a greater number of vacuum hoses (i.e. 15-20) will be utilized in actual practice. A conduit 61 is positioned above the nozzle 52, extending across the width of the fiberglass blanket 11. The vacuum hoses 59 are connected at their opposite ends from the nozzle 52 to the conduit 61.

A centrifugal compressor 62 is positioned at one end of the conduit 61, and includes an electric motor 63, which drives the compressor to thereby draw an airstream 64 into the vacuum system 51 through the nozzle 52. The airstream 64 created by the compressor flows through the fiberglass blanket 11 and is of sufficient strength to pull any loose fiberglass particles 66 from the surface of the fiberglass blanket and into the vacuum system. A filter compartment 67 is attached to the end of the conduit 61 adjacent the compressor 62. The airstream 64 is channeled along the conduit 61 and into the filter compartment 67, which traps and removes the loose fiberglass particles 66 from the airstream 64 prior to the airstream being discharged by the vacuum system.

As shown in FIG. 4, a high frequency sound emitter 68 is mounted within the nozzle 52 of the vacuum system 51. The high frequency sound emitter is typically an electronic signal generator or a transponder connected to an amplifier and a speaker mounted above the upper surface of the fiberglass blanket. The signal generator generates sound waves 69 of varying frequencies through its speaker, directed towards the fiberglass blanket 11. The sound waves generated by the high frequency sound emitter 68 are within a variable range of frequencies sufficient to disintegrate any loose fiberglass particles 66 of a selected length which have become broken off and lodged within the fiberglass blanket material 11 during the formation and handling of the fiberglass blanket.

The high frequency sound emitter disintegrates loose particles of fiberglass 3 to 10 microns in size, which are the particles most often inhaled into and become lodged in the lungs and bronchial tubes of workers. Once lodged in the lungs, these loose fiberglass particles can damage the cell structure of the lungs and lead to respiratory ailments. By disintegrating these loose particles of fiberglass during the laminating process, the health risks to workers from inhaling these particles is significantly decreased.

To find the proper frequency required for the disintegration of the fiberglass particles, the high frequency sound emitter 68 is adjusted while the fiberglass blanket 11 passes beneath it until the specific frequency at which the widest range of sizes of the fiberglass particles is disintegrated is determined. This value will vary for fiberglass blanket materials manufactured by different makers. However, once the values for the fiberglass materials manufactured by the different manufacturers are generally determined, the high frequency sound emitter 68 can be set at the frequency required for disintegrating fiberglass particles within the fiberglass blanket material from a specific manufacturer at the start of a laminating operation and minor adjustments made as needed.

As shown in FIGS. 2 and 5, a second sound emitter, a low frequency sound emitter, 71 is positioned below the backing sheet 24 and the fiberglass insulation material 10, adjacent the nozzle 52 of the vacuum system 51. The low frequency sound emitter 71 includes a signal generator 72, capable of generating sounds within a variable range of frequencies. As shown in FIG. 5, a series of approximately six speakers 73, 74, 76, 77, 78, and 79 are mounted below the backing sheet 12 in contact with the downwardly facing surface of the backing sheet. The speakers are typically subwoofers, for example eight-inch subwoofers, spaced at one foot intervals across the six-foot span of the insulation material 10. An amplifier, not shown, is typically provided, connected to the signal generator 72 and each of the speakers 73, 74, 76, 77, 78, and 79 to increase the strength of the sounds generated by the sound generator.

Sound waves 81 generated by the low frequency sound emitter 71 are directed by the speakers 73, 74, 76, 77, 78, and 79 through the insulation material 10. The sound waves 81 cause dust and the loose particles of fiberglass 66, which are larger than 3-10 microns and hence have not been destroyed by the high frequency sound emitter 68, within the fiberglass blanket material 11 to vibrate and move through the fiberglass blanket material. The sound waves are typically of a frequency within a range of approximately 15 cycles per second up to approximately 60 cycles per second.

The frequency of the sound waves 81 generated is varied until the specific frequency at which the maximum amount of loose particles of fiberglass 66 are vibrated and moved through the fiberglass blanket material 11 is determined. This optimal frequency is determined by adjusting the sound generator 72 to create different frequencies, and measuring the amount of loose particles of fiberglass disturbed by sound waves 81 of these frequencies by the use of a laser or similar measuring device directed across the upper surface of the fiberglass blanket material. For example, a frequency of approximately 18 cycles per second has been found to cause a large degree of vibration of the loose particles of fiberglass within the fiberglass blanket, and is at such a low frequency as to be barely audible to the human ear and thus does not pose a danger to the hearing of workers in the plant.

The vibration and resulting migration of the loose particles of fiberglass 66 through the fiberglass blanket material due to the sound waves produced by the low frequency sound emitter 71 enhances the ability of the vacuum system 51 to draw out and remove the dust and remaining loose particles from the fiberglass blanket material. These larger fiberglass particles and the dust created by the disintegration of the 3-10 micron size particles irritate the skin of workers when they come in contact with the workers' skin, and can irritate and cause blurred vision if they come in contact with the eyes of workers. Consequently, it is important to remove as much of these particles as possible during the laminating process to reduce the health risks to those handling and installing the insulation material.

Collection rolls 86 are shown in FIG. 2 at the discharge end 28 of the processing path 26 and are positioned after the vacuum system 57 of the laminating apparatus 25. The laminated blanket and backing sheet 10 is accumulated in a spiral roll 87 on the collection rolls 86. The collection rolls 86 function as a storage means on which the finished laminate fiberglass heat insulation material 10 is wound for storage.

OPERATION

In operation of the laminating apparatus 25, as schematically illustrated in FIGS. 2 and 3, the backing sheet 12 is fed from backing sheet feed rollers 29 and advanced along the processing path 26 in the direction of arrow A. The backing sheet 12 is passed upwardly and horizontally over the first set of guide rollers 31 and 32 to align the backing sheet 12 for engagement with the adhesive applicator 33.

The side surface 18 of the backing sheet 12, which is facing downwardly at this point, contacts the adhesive roller 36 of the adhesive applicator 33 as the backing sheet 12 advances along the processing path 26. As FIG. 3 illustrates, this contact causes the adhesive roller 36 to rotate in the direction of arrow C into and out of the liquid adhesive material 41 contained in adhesive containment vessel 34. The adhesive roller 36 carries liquid adhesive material 41 upwardly into contact with the side surface 18 of the backing sheet 12 as it rotates. As a result, a substantially uniform coating of adhesive material 43 is applied to the side surface 18 of backing sheet 12.

After the adhesive material 39 has been applied to the backing sheet 12, the backing sheet 12 proceeds around a second pair of guide rollers 44 and 46. These guide rollers 44 and 46 cause the backing sheet 12 to be reoriented such that the adhesively coated side surface 18 which formerly faced downwardly now faces upwardly.

As shown in FIGS. 2 and 3, the fiberglass blanket 11 is fed from the fiberglass blanket feed roller 47 and directed downwardly into contact with the adhesively coated side surface 18 of backing sheet 12 by blanket guide roller 48. The fiberglass blanket 11 is fed onto the backing sheet 12, on top of the adhesive coating 43 of the adhesively coated side surface 18 of the backing sheet 12 as shown at 49.

As shown in FIGS. 2 and 4, the two layers of material then pass the high frequency sound emitter 68, which emits sound waves that pass through the fiberglass blanket 11. The sound waves cause loose fiberglass particles 66, of a selected range in size (i.e., 3-10 microns), within the fiberglass blanket to vibrate and to be disintegrated.

At the same time that the 3-10 micron sized loose fiberglass particles 66 within the fiberglass blanket 11 are being disintegrated, the laminate insulation material 10 (FIGS. 2 and 3) is passed beneath the nozzle 52 of the vacuum system 51. An airstream 64 is created by the compressor 62 of the vacuum system 51 and is induced over the upper surface 14 of and through the fiberglass blanket material 11, and is drawn into the nozzle 52 of the vacuum system 51.

The airstream 64 has a tendency to pass through the porous fiberglass blanket 11 to clear the fiberglass blanket 11 of fibers of glass broken from the fiberglass blanket during the compression, bending and other handling of the fiberglass blanket 11. An area of negative pressure is created around the area of the nozzle 52 by the airstream 64 being drawn through the fiberglass blanket and into the vacuum system 51, lifting the combined fiberglass blanket and backing sheet against the nozzle and drawing the loose fiberglass particles 66 into the vacuum system.

As the blanket material passes and engages the lower edges 54 of the side surfaces 53 of the nozzle 52, the upper surface 14 of the fiberglass blanket material is scuffed by the lower edges 54 of the nozzle. This scuffing tends to separate loose strands of fiberglass from the surface of the blanket and thus frees particles of fiberglass that normally would not have been set free by the laminating process, but which would have been set free during the later installation and manipulation of the insulation material by workers at a job-site. These loose particles of fiberglass are removed from the blanket material by the vacuum system to ensure that the blanket material will be substantially cleaned of loose particles of fiberglass.

Additionally, the force with which the reduced pressure of the vacuum created by the vacuum system induces the fiberglass blanket to move toward contact with the nozzle and the frictional engagement of the blanket and the nozzle tends to lightly stretch the blanket and open any wrinkles of the blanket and to cause the proper length of blanket to be matched with and adhesively connected to the backing sheet. This ensures more accurate and uniform cuts of sheets of the laminated insulation material, as each roll of insulation material is finished by the laminating apparatus 25.

At the same time the airstream is pulling the fiberglass particles from the fiberglass blanket, the sound waves 81 (FIG. 5) emitted by the speakers 73, 74, 76, 77, 78, and 79 of the low frequency sound emitter 71 vibrate the dust and larger loose fiberglass particles within the fiberglass blanket that have not been disintegrated by the high frequency sound emitter. This vibration of the dust and loose fiberglass particles and the air movement causes the fiberglass particles to work their way through the fiberglass blanket, so that these fiberglass particles are drawn out of the fiberglass blanket by the airstream 64 and into the vacuum system 51. Additionally, the vibration created by the sound waves enhances the scuffing of the fiberglass blanket by the nozzle of the vacuum system by shaking the fiberglass blanket and causing it to rub against the edges of the nozzle. As a result, additional particles of fiberglass are dislodged from the fiberglass blanket and are removed by the vacuum system. Thus, the low frequency sound emitter enhances the cleaning of loose fiberglass particles from the fiberglass blanket by the vacuum system.

As shown in FIGS. 2 and 3, once the loose particles of fiberglass 66 have migrated through the fiberglass blanket material 11, they sometimes tend to bounce across the upper surface 14 of the fiberglass blanket material. The air flow being drawn across the upper surface of the fiberglass blanket material from outside the nozzle toward the nozzle sweeps or draws the loose fiberglass particles bouncing over the upper surfaces of the fiberglass blanket into the nozzle, through the air holes 56 formed adjacent the lower edges 54 of the side surfaces 53 of the nozzle 52, as indicated by arrows 57 and beneath the edge of the nozzle. This ensures that the upper surface of the fiberglass blanket material is substantially cleaned of any loose fiberglass particles.

The result of such a significantly cleaner fiberglass insulation material is a significant reduction in the amount of airborne dust and fibers introduced into the work environment of a job-site where the insulation material is being installed, as well as in the laminating plant itself, thereby greatly reducing the health risks passed to workers handling and installing the insulation material due to exposure to such dust and fibers.

As the airstream 64 draws the glass fibers out of the fiberglass blanket, the reduced air pressure in the blanket caused by the air moving from the blanket to the vacuum system 57 results in drawing the backing sheet 12 into uniform contact with the fiberglass blanket 11 over a length and width substantially equal to the length and width of the nozzle. Consequently, it is not necessary to exert compression force with a roller or other mechanical device to the backing sheet to adhere the fiberglass blanket to the backing sheet, thereby reducing the amount of glass fibers broken away from the fiberglass blanket during compression. Since the liquid adhesive material is a water based glue, the flow of the airstream 64 through the fiberglass blanket removes some of the moisture of the adhesive and thus tends to advance the drying process of the adhesive material.

Additionally, the passage of the airstream 64 through the fiberglass blanket 11 substantially removes any offensive odors present in the blanket, the backing sheet, and adhesive. Formaldehyde is used as a disinfectant and cleaner in the manufacture of fiberglass and has an unpleasant odor which is carried with the fiberglass blanket 11. As the airstream 64 flows through the fiberglass blanket 11, drawing out the loose fiberglass particles, it also draws out some of the airborne formaldehyde, thus removing this odor from inside the plant.

A further function performed by the airstream 64 is the decompression of the fiberglass blanket 11. The compression of the fiberglass blanket 11 as it is formed and rolled into a supply reel 45 tends to reduce the sizes of the air spaces (not shown) formed between the fibers of the fiberglass material when it is spun. These air spaces trap "dead air" which aids in retarding the transfer of heat through the insulation material, thereby enhancing the insulation properties of the material. By compressing and reducing the size of the fiberglass blanket, the size of these air spaces are also compressed and reduced, diminishing the heat insulation properties of the material. However, as the airstream 64 passes through and draws the broken glass fibers from the fiberglass blanket 11, it simultaneously tends to lift the adjacent surface of the fiberglass toward the nozzle. As a result, the air spaces between the fibers tend to expand, and the previously diminished heat insulation capabilities of the insulation material 10 tend to be restored.

After the laminated fiberglass heat insulation material 10 is completely formed, it will be wound into a reel package on rollers 86 for storage. The resultant laminate fiberglass heat insulation material formed by the above described method and apparatus has improved heat insulation properties and a significant reduction in the amount of broken glass fibers contained within the finished insulation material not found with fiberglass insulation materials formed by conventional methods.

DESCRIPTION OF AN ADDITIONAL EMBODIMENT

Figure 6:
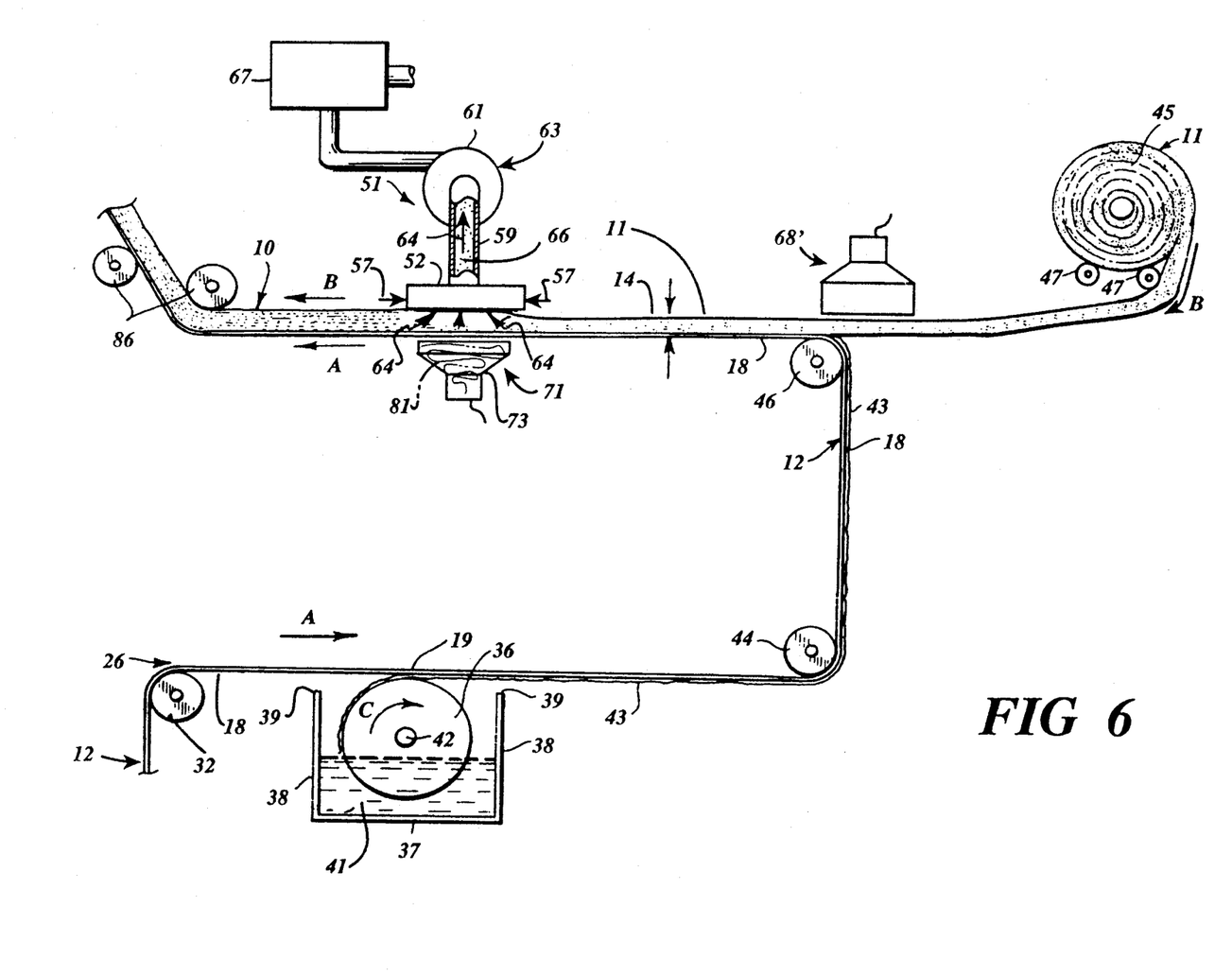
FIG. 6 is a schematic side illustration of a second embodiment of the apparatus and process for forming the laminate fiberglass heat insulation material.

FIG. 6 illustrates an additional embodiment of the laminating apparatus 25. In this embodiment, the high frequency sound emitter 68' is positioned upstream from the point 49 where the fiberglass insulation blanket 11 is fed into adhesive contact with the adhesively coated side surface 18 of the backing sheet 12. Accordingly, the larger loose particles of fiberglass 66 contained within the fiberglass blanket can be disintegrated before the fiberglass blanket and backing sheet are combined. This ensures that the loose particles of fiberglass of predetermined sizes will be completely disintegrated prior to the fiberglass blanket passing adjacent the vacuum system without interference from the backing sheet 12.

It will be understood that the foregoing relates only to a preferred embodiment of the present invention. It should be understood by those skilled in the art that numerous changes and modifications can be made to the described embodiment of the invention without departure from the spirit and scope of the invention as set forth in the following claims.

We claim:

1. A method of attaching an elongated blanket of fiberglass insulation material to an elongated backing sheet, comprising the steps of:

advancing the blanket and the backing sheet along their respective lengths into an overlying, parallel contacting relationship;

applying an adhesive between facing surfaces of the blanket and the backing sheet;

directing low frequency sound waves through the blanket to cause loose particles of fiberglass within the blanket to vibrate and move with respect to the blanket; and as the loose particles vibrate and move with respect to the blanket, inducing an air flow into a nozzle juxtaposed the blanket so as to draw air through and about the surface of the blanket facing the nozzle at a velocity sufficient to draw out and remove loose particles of fiberglass from the blanket.

2. The method of claim 1 and wherein the step of applying adhesive between the facing surfaces of the blanket and backing sheet comprises applying adhesive to the surface of the backing sheet as the surface of the backing sheet moves toward an underlying contacting relationship with the blanket.

3. The method of claim 1 and further including the step of disintegrating fiberglass particles of predetermined sizes after the adhesive has been applied between the facing surfaces of the blanket and backing sheet.

4. A method of laminating a blanket of fiberglass insulating material and a sheet of backing material, comprising the steps of:

advancing a fiberglass blanket along its length along a processing path;

advancing a sheet of backing material along its length into an underlying relationship with the fiberglass blanket;

applying an adhesive material between facing surfaces of the sheet of backing material and the fiberglass blanket;

after the adhesive material has been applied, attaching the fiberglass blanket and sheet of backing material together in adhesive contact;

as the fiberglass blanket moves along its length applying sound waves through the blanket to vibrate loose particles of fiberglass within the fiberglass blanket and cause such loose particles to move through the blanket;

removing the loose particles of fiberglass from the fiberglass blanket;

accumulating the attached blanket and sheet of backing material.

5. The method of claim 4 and wherein the step of removing the loose particles of fiberglass comprises inducing an airflow through a vacuum duct positioned adjacent the fiberglass blanket, passing the fiberglass blanket and sheet of backing material adjacent the vacuum duct, and drawing the loose particles of fiberglass away from the fiberglass blanket and into the vacuum duct.

6. The method of claim 4 and wherein the step of applying sound waves comprises the step of disintegrating loose particles of fiberglass of a predetermined size present within the fiberglass blanket after the adhesive material has been applied.

7. The method of claim 6 and wherein the step of disintegrating loose particles of fiberglass of a predetermined size comprises passing the fiberglass blanket adjacent a high frequency sound emitter, and directing sound waves of a frequency sufficient to cause the disintegration of loose particles of fiberglass of a predetermined size emitted by the high frequency sound emitter toward the fiberglass blanket.

8. A method of attaching an elongated blanket of fiberglass material to an elongated backing sheet comprising the steps of:

advancing the blanket and backing sheet along their respective lengths into an overlying, parallel, contacting relationship;

applying an adhesive to facing surfaces of the blanket and backing sheet so that the blanket and backing sheet adhere to each other;

directing low frequency sound waves through the blanket to cause loose particles of fiberglass within the blanket to vibrate and move with respect to the blanket;

as the loose particles of the fiberglass blanket vibrate, moving the blanket adjacent an edge of an air induction nozzle;

as the blanket moves adjacent the edge of the air induction nozzle, engaging the edge of the nozzle with the fiberglass of the blanket; and drawing air across the portion of the blanket at the air induction nozzle and into the air induction nozzle and collecting with the air drawn into the nozzle the loose fiberglass particles that are moving with respect to the blanket so that the loose fiberglass particles are removed from the blanket.

9. The method of claim 8 and wherein the step of engaging the edge of the nozzle with the blanket comprises scraping the blanket against the edge of the nozzle.

10. The method of claim 9 and wherein the step of drawing air across the portion of the blanket at the air induction nozzle comprises drawing air through a series of air holes formed at the edge of the nozzle and adjacent the portion of the blanket material engaging the edge of the nozzle.

11. The method of claim 8 and wherein the step of directing sound waves toward the blanket comprises applying sound waves to opposite sides of the blanket.

12. The method of claim 8 and wherein the step of directing sound waves to the blanket comprises directing sound waves to the blanket after the backing sheet and blanket have been arranged in overlying contacting relationship.

13. The method of claim 8 and wherein the step of vibrating the fiberglass of the blanket comprises directing sound waves toward the blanket at a frequency between 15 and 60 cycles per second and at an amplitude sufficient to cause loose particles of fiberglass to vibrate.

14. The method of claim 8 and further including the step of accumulating the adhered blanket and backing sheet in a spiral roll.

* * * * *